United States Patent
Klos et al.

(10) Patent No.: US 11,435,736 B2
(45) Date of Patent: Sep. 6, 2022

(54) CAUSE DETERMINATION OF ANOMALOUS EVENTS

(71) Applicant: SIEMENS AKTIENGESELLSCHAFT, Munich (DE)

(72) Inventors: Hans-Henning Klos, Weigendorf (DE); Christoph Paulitsch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 83 days.

(21) Appl. No.: 17/046,768

(22) PCT Filed: Mar. 6, 2019

(86) PCT No.: PCT/EP2019/055518
§ 371 (c)(1),
(2) Date: Oct. 9, 2020

(87) PCT Pub. No.: WO2019/197082
PCT Pub. Date: Oct. 17, 2019

(65) Prior Publication Data
US 2021/0116905 A1    Apr. 22, 2021

(30) Foreign Application Priority Data
Apr. 11, 2018  (EP) .................................. 18166733

(51) Int. Cl.
G05B 23/02    (2006.01)
(52) U.S. Cl.
CPC ..... G05B 23/0281 (2013.01); G05B 23/0235 (2013.01); G05B 23/0264 (2013.01)

(58) Field of Classification Search
CPC ............ G05B 23/0235; G05B 23/0264; G05B 23/0281
USPC ........................................................ 702/183
See application file for complete search history.

(56) References Cited

U.S. PATENT DOCUMENTS

| | | | | |
|---|---|---|---|---|
| 5,461,329 | A * | 10/1995 | Linehan | G01R 31/343 |
| | | | | 702/77 |
| 7,310,590 | B1 | 12/2007 | Bansal | |
| 2012/0041575 | A1 | 2/2012 | Maeda | |
| 2013/0060505 | A1 * | 3/2013 | Brennan | G01R 31/2894 |
| | | | | 702/117 |

(Continued)

FOREIGN PATENT DOCUMENTS

WO        2017086963 A1    5/2017

OTHER PUBLICATIONS

International Search Report and the Written Opinion for International Patent Application PCT/EP2019/055518 dated Jul. 13, 2019.

*Primary Examiner* — John H Le
(74) *Attorney, Agent, or Firm* — Lempia Summerfield Katz LLC (57) ABSTRACT

The invention relates to a method for evaluating at least one data set of at least one component of an automation system, characterized by the incorporation and/or execution of the following steps: determining an interval between two anomalous events in a first data set, said first data set comprising data based on at least one first component of the automation system, and determining repeating events which are spaced according to the interval in a second data set, said second data set comprising at least one second component of the automation system.

19 Claims, 9 Drawing Sheets

(56) References Cited

U.S. PATENT DOCUMENTS

2013/0282336 A1   10/2013  Maeda
2017/0359366 A1*  12/2017  Bushey ............... H04L 63/1433
2019/0280815 A1*   9/2019  Chang ................... H04L 1/0045

* cited by examiner

CAUSE DETERMINATION OF ANOMALOUS EVENTS

This application is the National Stage of International Application No. PCT/EP2019/055518, filed Mar. 6, 2019, which claims the benefit of European Patent Application No. EP 18166733.8, filed Apr. 11, 2018. The entire contents of these documents are hereby incorporated herein by reference.

BACKGROUND

The present disclosure relates to the recognition of anomaly events and corresponding causality in detected or measured data.

The published patent application WO 2017086963 A1 has disclosed a method for detecting an anomaly in data that is provided by each correlated sensor of a plurality of correlated sensors. This involves receiving time series data sequences from each sensor, and determining a numeric representation for each of the time series data sequences. This also involves finally determining an anomaly value for each of the time series data sequences using the determined numeric representation for each of the time series data sequences, and obtaining a distribution of the determined anomaly values under normal conditions.

The patent specification U.S. Pat. No. 7,310,590 B1 has disclosed analyzing a time series by multiple functions simultaneously to identify an anomaly for a data point in the time series. Data point values are predicted by a multiple functions. An anomaly occurs when an actual data point in the series differs significantly from the data point's predicted value as generated by the functions. If enough statistical models have ascertained an anomaly for a data point, an anomaly event is generated there. The set of functions may include different types of functions, the same function type configured with different constants, or a combination of these. Further, the published patent application US 20120041575 A1 has also disclosed an anomaly detection method.

These known anomaly detection methods do not, or do not automatically, recognize the underlying substantive matter (e.g., the cause of one or a plurality of anomaly events), such that cause recognition cannot, or cannot automatically, be effected.

SUMMARY AND DESCRIPTION

The scope of the present invention is defined solely by the appended claims and is not affected to any degree by the statements within this summary.

The present embodiments may obviate one or more of the drawbacks or limitations in the related art. For example, one or a plurality of potential causes of an anomaly or one or a plurality of anomaly events are recognized. As another example, an improvement of the anomaly detection is provided.

In a first embodiment, a method for evaluating at least one data set of at least one component of an automation system is provided. In this case, the method includes and/or instigates the following acts: determining an interval between two anomaly events in a first data set. The first data set includes data relative to at least one first component of the automation system. Repeating events spaced according to the interval are determined in a second data set. The second data set includes data of at least one second component of the automation system.

The method may be a computer-implemented method. The method may additionally be used in a process and/or automation engineering installation. In this case, the method may serve for recognizing repeating process influences that are encoded, for example, as events (e.g., in the second data set). Proceeding from this, the method may be used for control and/or monitoring of the operational management in the installation. The method may find application in an installation with one or a plurality of cyclic processing steps. By way of example, it is possible to detect wear (e.g., of a machine tool or of a gear mechanism) or to recognize a change in the settings of one or a plurality of the devices of the installation used for carrying out the processing steps. Further applications reside, for example, in a change in the lifting process and/or the transport process in a press. Further processes with cyclic processing steps are found in the semiconductor industry, for example. Cyclic processing steps may be present, for example, in the periodicity of a cycle of processing steps such as, for example, in assembly (e.g., in the automotive industry). The control of the installation may then be influenced, for example, such that one or a plurality of the repeating process influences are shifted or prevented by one or a plurality of interventions in the control of the installation being effected. In this case, the method may be carried out locally in the installation or on a remote computing unit (e.g., in a cloud infrastructure). Further, one or a plurality of acts of the method may be carried out in the installation, and one or a plurality of further acts of the method may be carried out in the remote computing unit (e.g., the cloud infrastructure).

In a second embodiment, a device (e.g., including one or more processors) for carrying out the method according to the first embodiment is provided.

In a third embodiment, a computer program including program code means for carrying out the method according to the first embodiment is provided. In this case, the computer program includes program code means that, when executed, serve to carry one or a plurality of the method acts of the method according to the first embodiment.

In a fourth embodiment, a computer program product including program code means is provided. In this case, the computer program product includes program code means that, when executed, serve to carry one or a plurality of the method acts of the method according to the first embodiment.

In a fifth embodiment, a data stream representing a computer program according to the third embodiment is provided.

DETAILED DESCRIPTION

Figure 1:
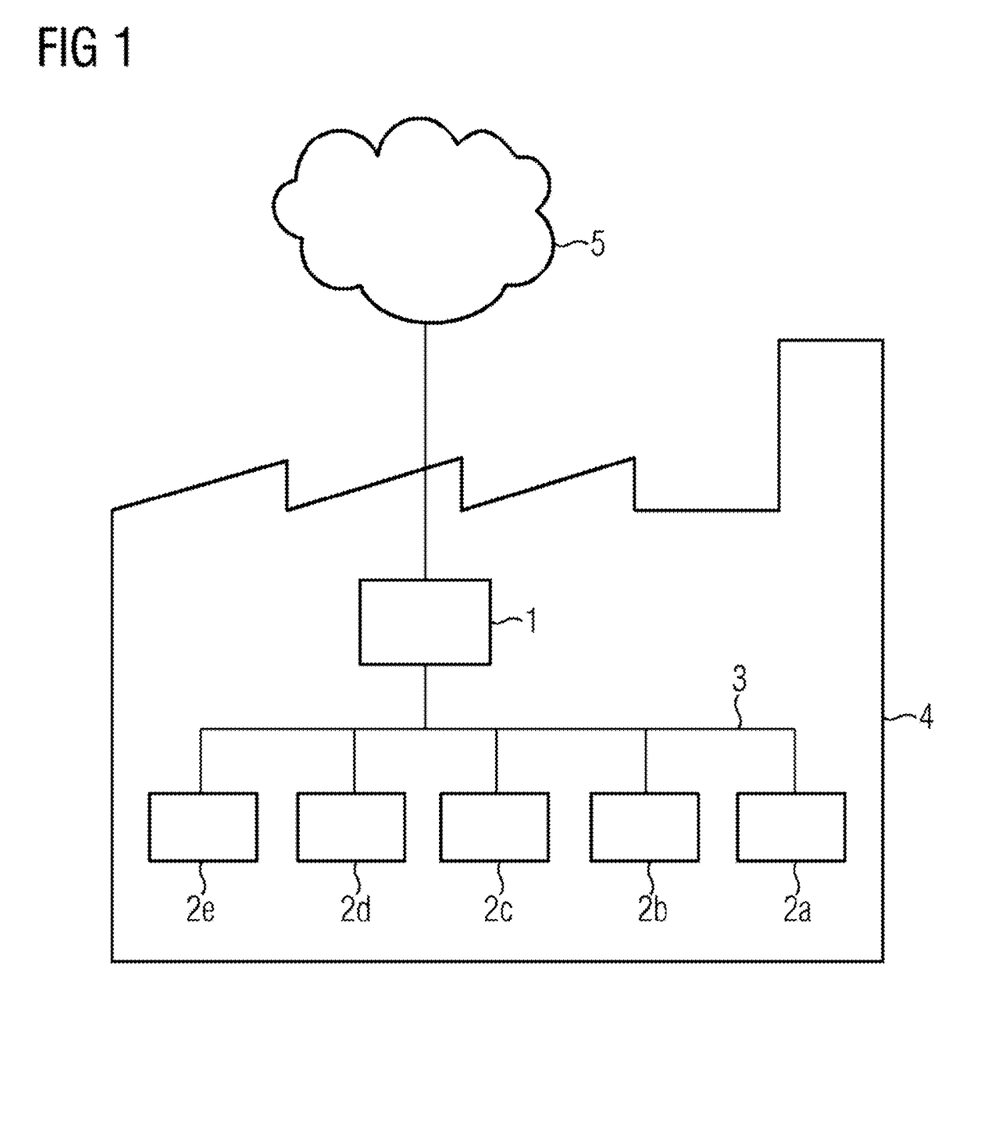
FIG. 1 shows a schematic illustration of one embodiment of an automation system connected to a cloud infrastructure.

In automation systems, as illustrated, for example, in FIG. 1, components, such as, for example, field devices, that serve for detecting and/or influencing process variables are used in many cases. For detecting process variables, measuring devices, such as, for example, filling level measuring devices, flow meters, pressure and temperature measuring devices, pH measuring devices, conductivity measuring devices, etc. that detect the corresponding process variables of filling level, flow rate, pressure, temperature, pH and conductivity, respectively, may be used. For influencing the process variables, actuators such as, for example, valves or pumps, by which, for example, the flow rate of a liquid in a pipeline or the filling level of a medium in a container is changed, may be used. The term component as used is intended to subsume all types of measuring devices and actuators. Further, all devices that are used in proximity to the process and yield or process information relevant to the process are also designated as components. Besides the measuring devices/sensors and/or actuators mentioned above, the term components generally also denote such units that are connected directly to a bus, such as, for example, a field bus, and serve for communication with a superordinate unit, such as, for example, remote I/Os, gateways, linking devices and a wireless adapter or radio adapter, PLC, etc. Depending on the size of the installation, one or a plurality of controllers PLC A, PLC B may be arranged at the field level. The communication between the controllers PLC A, PLC B and the components coupled to one of the controllers PLC A, PLC B is effected via at least one of the conventional field buses in automation engineering. At the control level, the controllers PLC A, PLC B supply data gathered from the components, such as, for example, measurement values, and/or measurement values that have been processed further to a superordinate control unit (e.g., a SCADA). The components of the automation system are configured with networking capability and connected to one another via a network, for example. In this case, each component may be assigned a unique address in the network. The communication may be effected by a network protocol. Thus, in the present case, a controller is also understood as a component. Further, one or a plurality of components may also be embodied purely in terms of software (e.g., in the form of a, agent, such as a software agent).

FIG. 1 shows an automation system connected to a cloud infrastructure 5. In order to produce a connection to the cloud infrastructure, a cloud interface is provided in the automation network 3 of the automation system. In this case, the cloud interface may be part of a communication device 1. The cloud interface may also be installed directly in the automation network 3 (e.g., in one of the components of the automation system; as an agent, such as a software agent). The automation system may have one or a plurality of components 2a, 2b, 2c, 2d, 2e, as shown in FIG. 1.

In this case, the cloud infrastructure may have one or a plurality of servers, one or a plurality of platforms, and/or one or a plurality of applications (e.g., computer programs that run or are executable on the one or the plurality of platforms). The cloud infrastructure can be, for example, the MindSphere from Siemens. In this case, the cloud infrastructure is realized by one or a plurality of computing units, for example, which may provide one or a plurality of cloud services.

The cloud infrastructure may thus be communicatively connected to the automation system 4. By way of example, the connection may be or have been established by the communication device mentioned above (e.g., a MindConnect Nano from Siemens). The communication device 1 may thus serve for data capture by way of one or a plurality of protocols, and makes it possible to transmit these data to the cloud infrastructure. In this case, the communication device 1 may support the communication of encrypted data via a secure Internet connection in order to enable cloud-based applications and services.

Under certain circumstances, however, large amounts of data arise within an automation system and/or during the transmission of data to the cloud infrastructure. This data is generated, for example, from a number of components such as actuators, internal and external sensors, odometry, and telemetry, which are usually monitored with high frequency. The separately monitored components may be regarded as dimensions, and a connection of monitored readings at a specific point in time may thus be regarded as a multidimensional point. Therefore, methods that generate an anomaly score for each given point may use calculations that take account of the density of the points, such as, for example, Mahalanobis Distance or K-Nearest Neighbor (KNN) or reduce the dimension of the multidimensional points by principal component analysis or self-organizing maps, as shown, for example, in the published patent application US 20130060524 A1.

In this case, the data may represent one or a plurality of physical and/or chemical variables that correlate with one another. These variables may be supplied by components, such as, for example, sensors, actuators and/or controllers. The components may be components of the same type or components of different types. By way of example, the components may be sensors that perform the same type or different types of measurement (e.g., temperature) of one or a plurality of physical and/or chemical variables and may be situated relatively close to one another (e.g., within the industrial installation).

An anomaly is usually defined as at least one data point that, in actually detected or measured value, differs from the detected or measured values of the remaining data points in a group, a pattern, a chain, or a data sequence (e.g., a data set) significantly enough, for example, to be marked as at least problematic. In other words, for historical reasons or in some other way, the detected or measured data suggests an expected "normal" value or range of normal values for the sampled data, and the anomaly is a data value that does not match or does not match accurately enough the normal value or range of normal values of the data. Other customary names for anomalies are outliers, deviations, abnormalities, surprises, intrusions, exceptions, etc. The group of data points that are sampled and are often examined for anomalies may be referred to as a time series, which is a sequence or a pattern of data that is measured over a period of time in which each data point corresponds to a discrete point or detected value in the time (e.g., a data point that is detected per second over a time period of one hour).

If an anomaly is detected or recognized, the detected or recognized anomaly often triggers a follow-up procedure (e.g., one that identifies the cause of the anomaly and/or prevents the anomaly from adding damage to the automation system that contains or uses the data; a type of process control system or a procedure). The follow-up procedure may correct problems caused by the detected anomaly in the automation system. Anomaly detection thus generally relates to the recognition of a pattern or patterns in a given data set that do not correspond to an established, expected, or normal behavioral data pattern. In general, it is desirable to detect the anomaly as early or as fast as possible, before the anomaly adds damage to the underlying data processing system and/or the automation system. In this case, the cause of an anomaly may be changes in the process proceeding in the automation system.

In general, the role of technology is constantly increasing and new applications and areas of application for existing technologies are being discovered on a daily basis. One such area is the use of sensors for monitoring the surroundings and for monitoring control devices (e.g., in industrial applications and in everyday public use). Examples may encompass ambient sensors situated outdoors, temperature sensors arranged in various rooms of a house, and a plurality of types of sensors situated for example in automobiles, trains, offices, factories, and computer networks. One of the main aims of sensor monitoring schemes is to recognize and prevent malfunctions during the control of devices by identifying anomalies as fast as possible in the measurement data supplied by the sensors. As already outlined, there are methods that may localize or determine anomalies in time series data.

In the industrial sphere, such as, for example, in an automation system, process influences (e.g., repeating process influences) are not recognized as such under certain circumstances, and the underlying, industry-specific operational management (e.g., owing to irregular pause times or the like, such as during transfer processes between stations in the semiconductor industry or in the pressing plant) may hinder cause detection.

A first act may involve recognizing one or a plurality of anomalies or one or a plurality of anomaly events in one or a plurality of data sets that are provided, for example, by one or a plurality of components representing, for example, correlated variables. This may be done, for example, by receiving one or a plurality of data sets (e.g., in the form of one or a plurality of time series from each of the plurality of data sources, such as one or a plurality of components such as sensors, actuators, or other components in proximity to the process). A data set may include data that is detected by a component with a sampling frequency. This may involve, for example, raw data from one or a plurality of components. Further, a data set may also contain derived data. By way of example, a data set (e.g., the first data set and/or second data set) may contain raw data and/or data calculated based on the raw data.

One or a plurality of anomaly events may be determined by a user, for example. This may be done, for example, by selecting one or a plurality of events from one of the data sets. Further, this may be done by selecting data in the data set (e.g., by a display and/or operator control unit).

In this case, the methods (e.g., method acts) mentioned in the context of the present disclosure may be carried out by a device that detects, for example, an anomaly in one or a plurality of data sets provided by one or a plurality of components and includes at least one processor connected to one or a plurality of storage units. The processor may be configured to receive a corresponding data set (e.g., in the form of a time series) from one, a plurality, or each of the plurality of components, where each data set may contain a plurality of data. The processor may, for example, also be configured to determine a numeric representation for each of the time series, to determine an anomaly value for each of the time series using the determined numeric representation for each of the time series, and to determine a distribution of the determined anomaly scores under normal conditions. A correspondingly suitable system is described, for example, in WO2017086963A1.

A corresponding device may be arranged physically within the automation system (e.g., in an embodiment as illustrated in FIG. 1). The device may be, for example, the communication device 5. This device may be configured to receive data from one, a plurality, or each of the plurality of components 2a, 2b, 2c, 2d, 2e. In this case, the device may communicate with each of the components 2a, 2b, 2c, 2d, 2e in a wireless or wired manner. Each component 2a, 2b, 2c, 2d, 2e may provide data of the respective component 2a, 2b, 2c, 2d, 2e to the device, for example, in a time series, such that each component may provide the respective data at discrete points in time (e.g., once per second, once per minute, once per hour, etc.). This may be achieved, for example, by each component 2a, 2b, 2c, 2d, 2e providing respective data continuously and the device then reading the data of each component periodically in the desired time intervals (e.g., once per second, once per minute, once per hour, etc.). If the sampling frequency is not identical for all of the components 2a, 2b, 2c, 2d, 2e, it is possible to calculate or determine a vector of statistics for each time series (e.g., a maximum, a minimum, a mean value, a standard deviation, higher-order moments, etc.). This enables a direct comparison of the data for each time series.

In addition, as outlined above, it is possible to determine an anomaly score in a step for each of the time series from the corresponding components, which may be, for example, temperature sensors, using a numeric representation calculated for each time series. For example, it is possible to calculate or determine an average distance (e.g., Euclidian, Manhattan or weighted) in relation to detected data from each component with respect to the other components using the numeric data representation determined.

In exemplary embodiments, the detected or measured data may then be processed in order to determine the presence of an anomaly, anomalies, an anomaly event, or anomaly events (e.g., within the pattern or the time series of data). If one or a plurality of anomalies or anomaly events are ascertained, a correction measure may be implemented in order to determine the cause of the anomaly and/or to prevent an underlying process control system.

Figure 2:
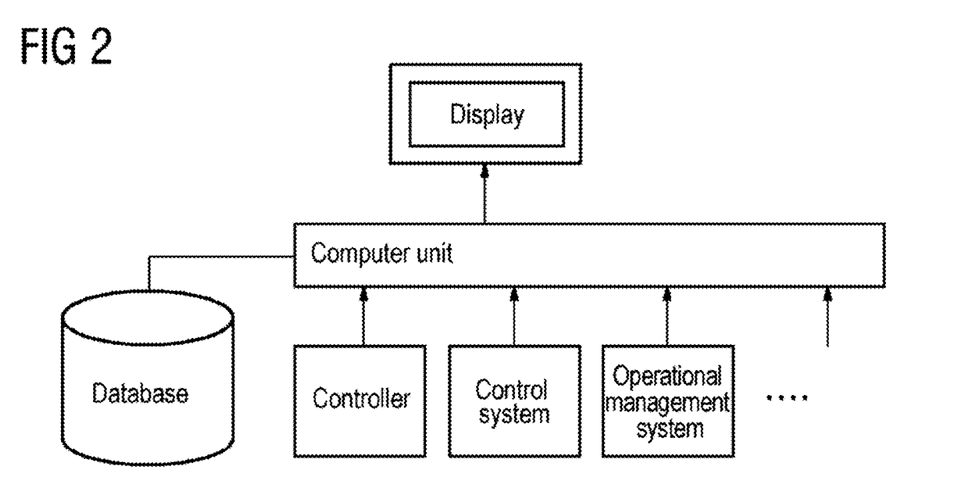
FIG. 2 shows a schematic illustration of a first embodiment of a device for evaluating at least one data set.

A further embodiment for the evaluation of at least one data set of at least one component of an automation system is illustrated in FIG. 2. In this case, one or a plurality of acts of the method may be carried out by a computer unit (e.g., on site in the automation system). The computer unit may be communicatively connected to one or a plurality of components such as, for example, a controller, a control system, and/or an operational management system. Further, further components, not shown, may be connected to the computing unit. One or a plurality of these components may thus transmit data to the computing unit. This data may then be saved or stored in a database, which may likewise be connected to the computer unit.

For recognizing an anomaly or one or a plurality of anomaly events, for determining an interval between two anomaly events in a first data set, and/or for determining repeating events spaced according to the interval in a second data set, it is therefore possible to use data from the database and/or from the components (e.g., directly from the components). In this case, one or a plurality of events correspond to data in the first dataset and/or the second data set.

In addition, for example, for initiating one or a plurality of correction measures, one or a plurality of events found in the second data set or a finding may be represented on a display connected communicatively to the computer unit. In this case, the display may be part of an application running, for example, in a browser of a user device.

The proposed method may be carried out on site in the automation system on a computer unit situated there. By way of example, it is possible to determine repeating events spaced according to the interval in a second data set in a communication device in accordance with FIG. 1. In this case, then, for example, only the events founds and/or findings derived therefrom may be transmitted to the cloud infrastructure and/or displayed.

Figure 3:
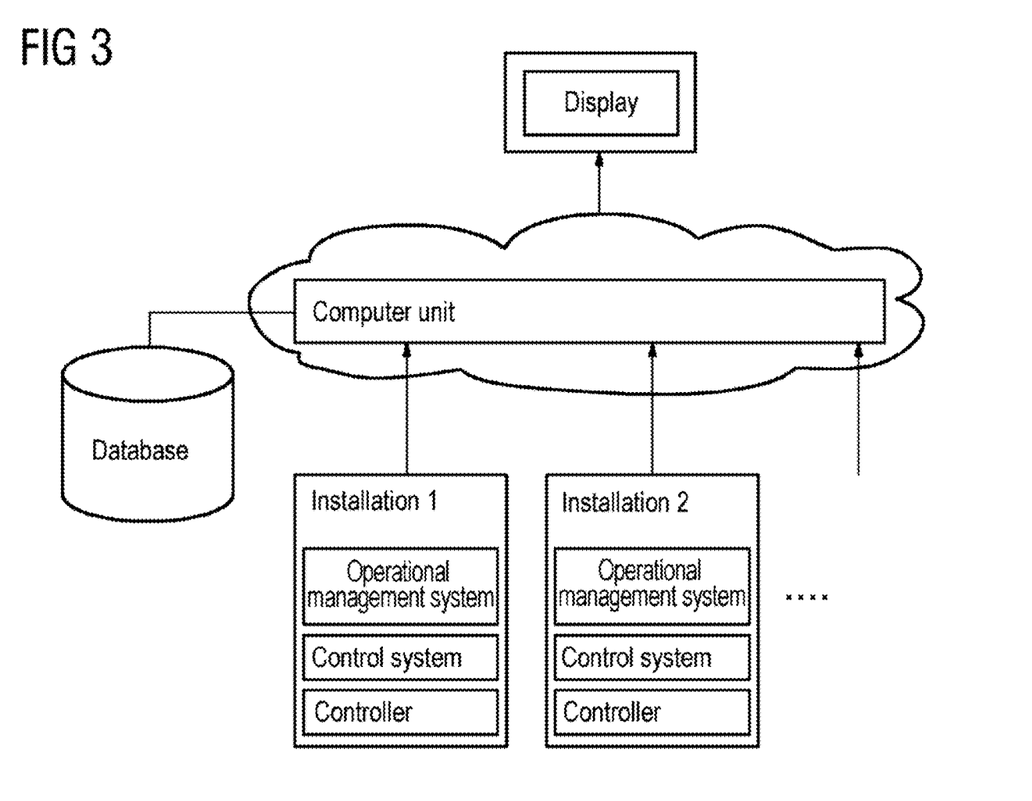
FIG. 3 shows a schematic illustration of a second embodiment of a device for evaluating at least one data set.

It is also possible, as illustrated in FIG. 3, for the evaluation to be carried out by a cloud infrastructure and/or by an application running in the cloud infrastructure. For this purpose, the data acquired from one or a plurality of components may be processed by an application running in the cloud infrastructure. In addition, the embodiment in which the application runs in the cloud infrastructure includes the advantage that a plurality of automation systems or subsystems of an automation system may be communicatively connected to the application, and the application thus runs centrally or may process data and/or data sets from a plurality of automation systems or subsystems. As illustrated, for example, in FIG. 3, a first automation system (e.g., subsystem) may include a first controller, a first control system, and/or a first operational management system. A second automation system (e.g., subsystem) may include a second controller, a second control system, and/or a second operational management system. Both automation systems, for the purpose of transmitting data from one or a plurality of the components, may be connected to the computer unit, which is arranged in a cloud infrastructure in accordance with the embodiment in FIG. 3. The computer unit may save or store the data received from the first automation system and/or the second automation system in a database that may be, for example, likewise part of the cloud infrastructure.

Further, it is possible to configure the application running in the computer unit or on some other device for the evaluation of one or a plurality of data sets by a display and/or operator control unit. By way of example, it is possible to identify data in the form of the one or the plurality of data sets and/or to identify one or a plurality of events in the data sets as anomaly events.

One or a plurality of results of the evaluation may then be represented on the display (e.g., in order that the one or the plurality of results of the evaluation are taken note of by a user).

For a more efficient interpretation of anomalies, a method for recognizing recurring relationships is provided. The method runs on a computing unit locally in installations or in a cloud infrastructure. The method evaluates the data from controller, control, and operational management systems, and optionally makes the result available to a user, such as, for example, a data analyst, on a display unit.

Figure 4:
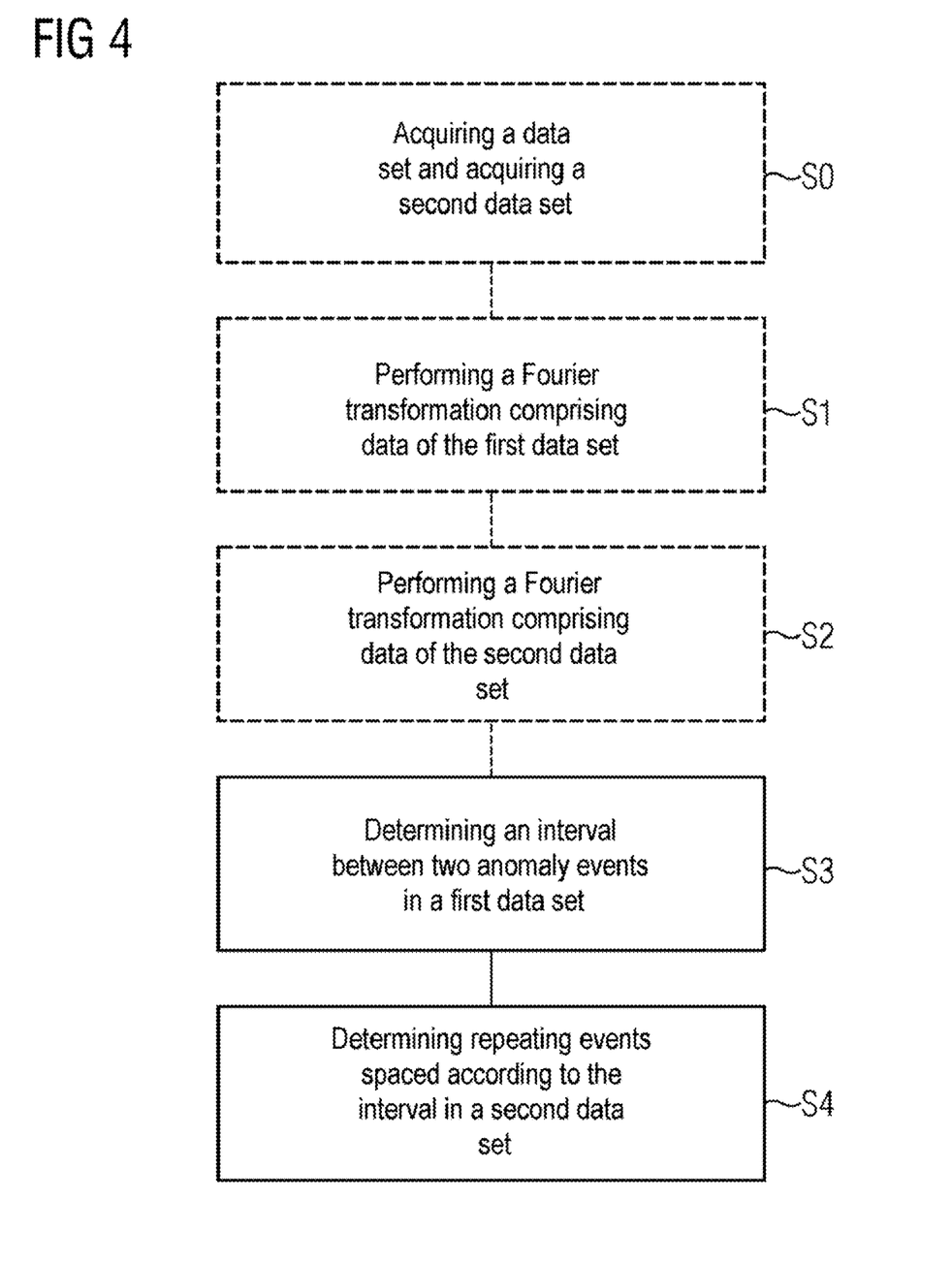
FIG. 4 shows a schematic illustration of an embodiment of a method for determining anomaly events by determining an interval between anomaly events.

FIG. 4 illustrates one embodiment of a method. First, in act S0, a first data set and/or a second data set is acquired or selected (e.g., by a user). This may be done, as already mentioned, automatically by the determination (e.g., continuation determination) of one or a plurality of anomalies in data (e.g., in a dataset) over time (e.g., by use of the data set directly or by manual inputting by a user). A data set may be the combination of a plurality of data. Acquiring a first data set and a second data set may be effected, for example, by loading the data set into an application (e.g., a computer program). In this case, the first data set may be acquired and/or loaded separately from the second data set. By way of example, the first data set and then the second data set may be acquired and/or loaded.

In act S1, provision may be made for performing a Fourier transformation including data of the first data set. In one embodiment, in this case, for example, the data corresponding to the anomaly events are subjected to a Fourier transformation. After, performing a Fourier transformation of the data of the second data set may be effected in act S2.

The first data set and/or the second data set may represent, for example, individual variables of one or a plurality of components of an automation system. The data sets may be subjected to a Fourier transformation, such as, for example, a Fast Fourier Transformation.

Determining an interval between two anomaly events in a first data set may be effected in act S3. The anomaly events may be one or a plurality of anomaly events of the same anomaly or anomaly events of different anomalies. An anomaly is reproduced, for example, in the Fourier transform by a peak (e.g., repeated occurrence of an event of one specific type or of a plurality of types). These events are referred to as anomaly events. A plurality of the peaks may occur in the Fourier transform. One or a plurality of peaks may correspond to different anomalies.

The anomaly events of an anomaly are therefore spaced apart from one another in the origin space (e.g., there is a cyclic interval between two, repeating, anomaly events). In the image space, the anomaly events form one or a plurality of peaks. Anomaly events of an anomaly are thus, in the origin space, all spaced equally from one another. For the case where anomaly events of different anomalies are considered, then the anomaly events of a first anomaly are also spaced from the anomaly events of a second anomaly (e.g., there is an interval, a second interval, different than the first interval under certain circumstances, between two anomaly events). If this interval is determined, then the determined interval may be used for finding relationships (e.g., dependences and causalities of one or a plurality of anomaly events).

Determining repeating events spaced according to the interval in a second data set may be effected in act S4. In one embodiment, in this case, one or a plurality of events in the second data set are determined based on the Fourier transform of the second data set. The events may be determined by determining events that are spaced according to the interval (e.g., determined by one or a plurality of anomaly events in the first data set). The anomaly events of a specific periodicity in the first data set may thus be assigned to events having the same periodicity in the second data set. The events in the second data set may be repeating data spaced according to the interval that was determined (e.g., by the first data set). Data in a data set (e.g., the second data set) may thus correspond to events, or events may be determined based on data. By way of example, a relationship may be recognized by a correlation of the Fourier transformations effected. Consequently, the cause research may be effected in the case of anomaly detection, and an automatic cause characterization can be effected. In this case, the periodicity may also be determined based on an extremal value consideration of the data or events in the first data set and/or the second data set. Further, based on a modelling or approximation (e.g., by one or a plurality of periodic functions, such as sine and/or cosine) of the data in the first data set and/or the second data set and a consideration of the arguments of the periodic function, it is possible to determine one or a plurality of intervals based on which one or a plurality of events that are the cause of one or a plurality of anomalies are determined.

The anomaly events determined in the first data set and/or the events determined in the second data set (e.g., which are spaced apart from one another according to the interval) may be recognized in act S4 and then be provided to a user. These events may be stored and/or displayed for this purpose.

Figure 5:
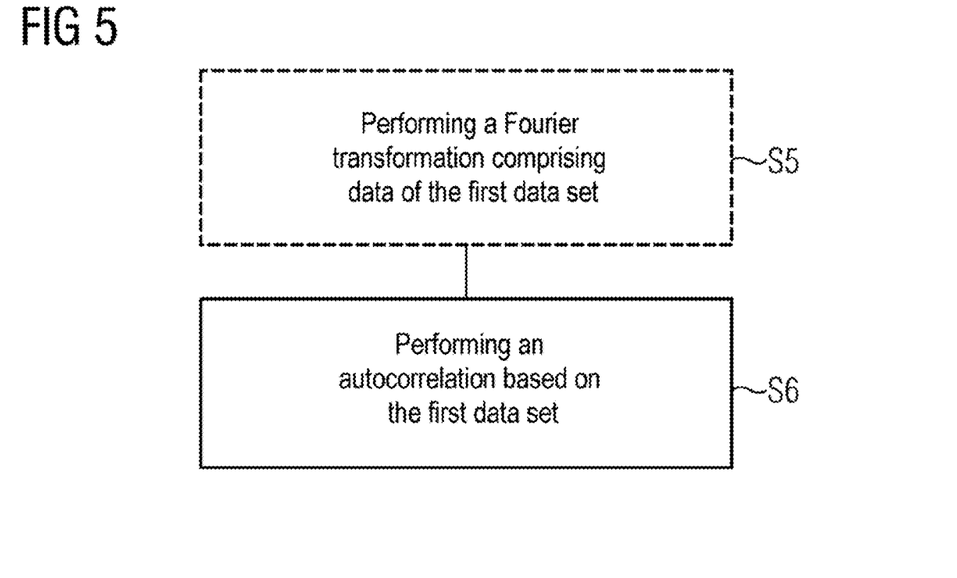
FIG. 5 shows a schematic illustration of an embodiment of a method for cause determination of anomaly events by performing an autocorrelation based on a first data set.

FIG. 5 illustrates further acts that, according to one embodiment, may be combined with those from the embodiment according to FIG. 4 or may be executed independently thereof.

Performing a Fourier transformation of the data of the first data set, as described in association with FIG. 4, may be effected in act S5. Performing an autocorrelation based on the first data set may be effected in act S6. In one embodiment, the Fourier transform of the first data set is used in this case. In one embodiment, for this purpose, the first data set contains data that originates from one or a plurality of components of the automation system and was acquired over different time periods. As a result, as described in association with the previous figures, it is possible to determine dependencies and/or causalities of events (e.g., in the form of periodically repeating events) in the first data set.

Figure 6:
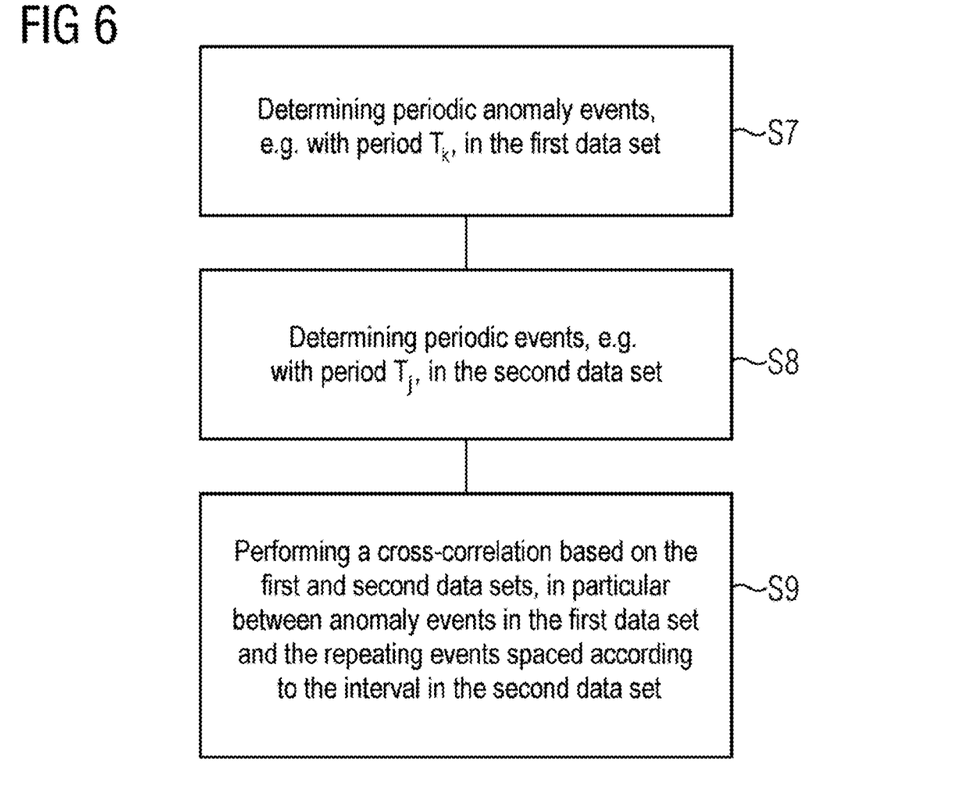
FIG. 6 shows a schematic illustration of an embodiment of a method for cause determination of anomaly events by performing a cross-correlation based on a first data set and a second data set.

FIG. 6 illustrates further acts of one proposed embodiment. Determining periodic anomaly events (e.g., with period Tk) in the first data set may be effected in act S7. The period may be the described interval representing spaced (e.g., temporally spaced) anomaly events in the first data set. Determining periodic events (e.g., with period Tj) in the second data set may be effected in act S8. In this embodiment, events in the first data set and the second data set are thus determined, which, under certain circumstances, do not have the same periodicity, but rather a different periodicity. Performing a cross-correlation based on the first data set and the second data set may be effected in act S9. In one embodiment, the cross-correlation may likewise be applied to a Fourier transform of the first data set and a Fourier transform of the second data set. In this case, performing the cross-correlation may be effected, as a basis, between anomaly events in the first data set (e.g., with periodicity Tk) and the repeating events of the second data set spaced according to the interval or the periodicity Tj. Consequently, if an anomaly or one or a plurality of cyclically occurring anomaly events are present, a cause determination may be effected. By way of example, dependencies of individual and multidimensional variables with respect to the anomaly and/or with respect to one another may be recognized.

While the recognition of repetitions in data is typically already applied to all time-dependent data fi(t), (e.g., KPI, process data, text, process management, event, MES, logistics, weather, etc.) in accordance with the present disclosure, a one-sided Fourier transformation for recognizing candidates for periodically recurring anomalies may also be applied only as a second act after the identification of relevant data with anomalies (e.g., data sets containing anomaly events). When applied directly to time-dependent signals, the Fourier transformation in accordance with the disclosure may be used for identifying periodic anomalies. While anomalies that recur periodically in the time domain f(t) (e.g., lemon automobiles) may remain undiscovered on account of the background noise, the anomalies are clearly recognizable in the spectral domain f(s), by virtue of an increased amplitude (e.g., with weekly frequency). In the case of a superimposed representation of each two spectra j and k, it is possible to recognize a common periodicity based on increased amplitudes at identical frequencies s. A subsequent correlation of the signals reveals, on the basis of increased amplitudes of the correlation function, which signals occur again in identical periods. This additional information of a periodic repetition of the signal with frequency s may help to identify the candidate as an anomaly. Autocorrelations (k j) may be used to recognize the periodicity (e.g., correlation length) Tk in one dimension. Upon subsequent cross-correlation (e.g., k≠j), the data is restricted to correlation length Tk in order to reduce the computational complexity and to attain hits rapidly.

Figure 7:
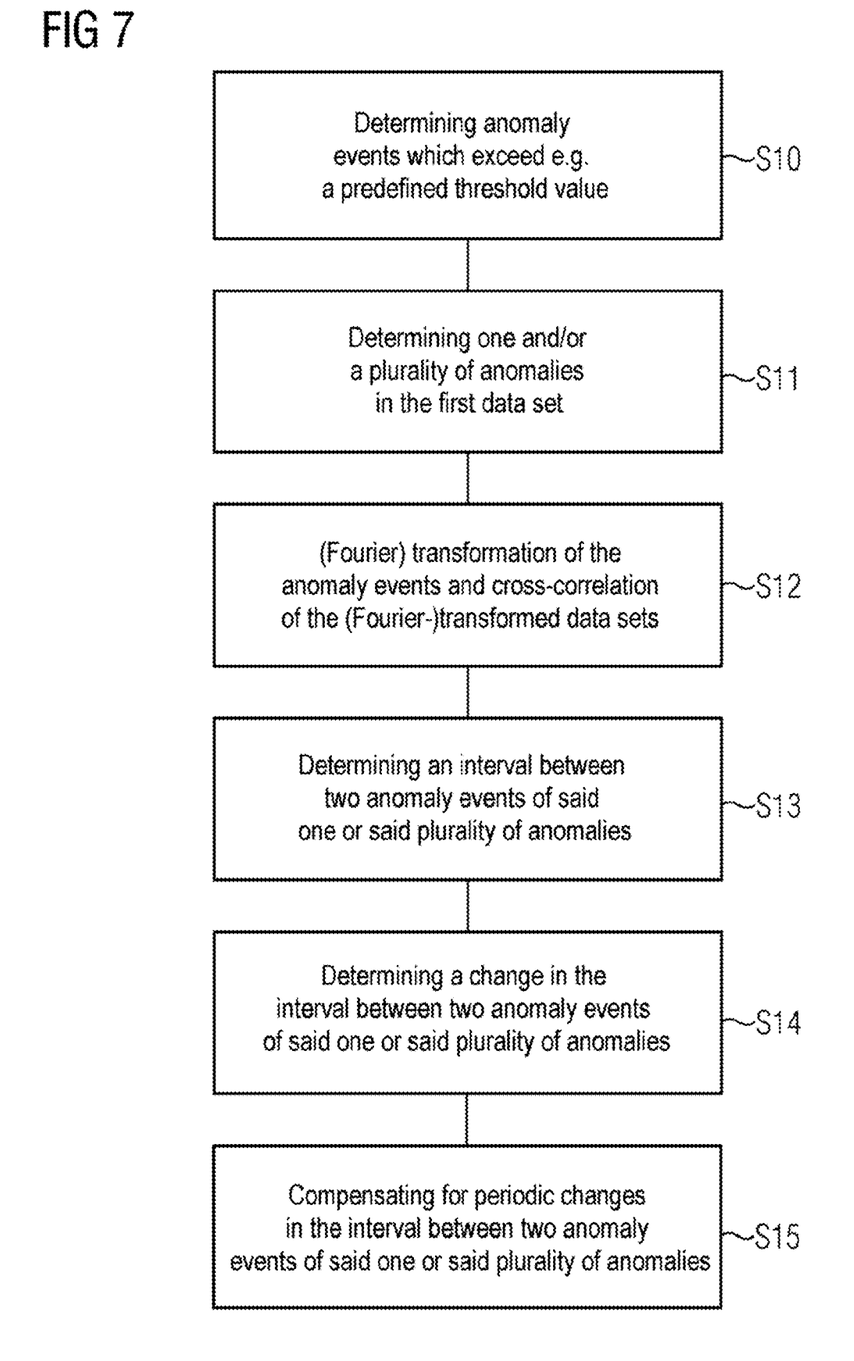
FIG. 7 shows a schematic illustration of an embodiment of a method for cause determination of anomaly events by compensating for changes in an interval between anomaly events.

FIG. 7 illustrates an embodiment including further acts. Determining anomaly events that exceed, for example, a predefined threshold value may be effected in act S10. By way of example, data of a first data set, of a second data set, and/or of further data sets may be used for this purpose. Determining one and/or a plurality of anomalies in the first data set may be effected in act S11. By way of example, anomalies determined by a user may be selected for this purpose. Additionally or alternatively, by way of example, anomalies having a specific minimum number of anomaly events may be determined. In this case, the threshold value may be predefined by, for example, a user. Further, the anomaly event may also be predefined (e.g., defined) by a user. The anomaly event may further be a pattern, such as, for example, a data sequence with rising values in the data set.

A transformation (e.g., a Fourier transformation) of the anomaly events and/or cross-correlation of the transformed data sets (e.g., Fourier-transformed data sets) may be effected in act S12. It is already possible to ascertain dependencies or causalities between anomalies that have occurred. Determining an interval between two anomaly events of the one anomaly or the plurality of anomalies may be effected in act S13. Determining a change in the interval between two anomaly events of the one anomaly or the plurality of anomalies may be effected in act S14. Compensating for periodic changes in the interval between two anomaly events of the one anomaly or the plurality of anomalies may be effected in act S15. As a result, for example, once dependencies or causalities have been recognized, the dependencies or causalities may be tracked, and, for example, changes in an interval between anomalies (e.g., as a result of interruption(s), such as one or a plurality of pauses) may be taken into account. The changes are, for example, caused by the operation of the operation system. For example, recurring relationships in an automation system, such as in the case of repeating process influences, in the case of irregular pause times, or transfer processes between workstations, may thus be recognized.

The periodicity may be determined not only over time, but also vis-à-vis any other variables fj, by calculating the Fourier transformation progressively over the data present. When applying the Fourier transformation, a non-uniformly sampled frequency analysis is to be taken account of since the variables fi are generally not present with uniform spacing. This analysis recognizes repeating changes in the anomaly indicator vis-à-vis other variables, such that it is possible to identify, for example, cyclic deviations under different operational conditions (e.g., in the case of multiples of the power or rotational speed). The different operational conditions may be compensated for by a preprocessing (e.g., by using the variables flj(t)=Bl(t)fj(t) only under the desired L-th operational condition Bl(t)=1 for t=1 and B(t)=0 for t≠1). Further, it is possible to supplement values not present for spectral analyses, not for correlation analyses (e.g., by zero padding). Further, it is possible to carry out an interpolation by upsampling with an interpolation function (e.g., polynomial, spline, etc.) or resampling as downsampling of the "faster" variable (e.g., filter and decimation). If no values are present at specific points of a plurality of sensors, it is possible to remove the values at these points from all the signals in order to prevent a spurious correlation by the values being set to zero. If the functional dependence of the anomaly indicator on the operational conditions is known, this functional dependence is encoded in a wavelet and a wavelet transformation is carried out instead of the Fourier transformation.

If one or a plurality of anomalies are recognized, the periodicity thereof may be determined in a simple manner by way of applying a Fourier transformation to the anomaly indicator a(t). Cyclic changes in the anomaly indicator may represent an indication of regular relearning and thus an anomaly indicator that is not yet mature. For example, under cyclically changing operational conditions (e.g., shift operation, annual production fluctuations, recurring process steps, employees, batches, production steps) that have not been taken into account in the anomaly indicator, periodically changing indicators occur. The periodicity of the frequency ω that is discovered as a result of the Fourier transformation may be compensated from the anomaly indicator with a'(t)=a(t)/(aω·sin(ωt)).

Figure 8:
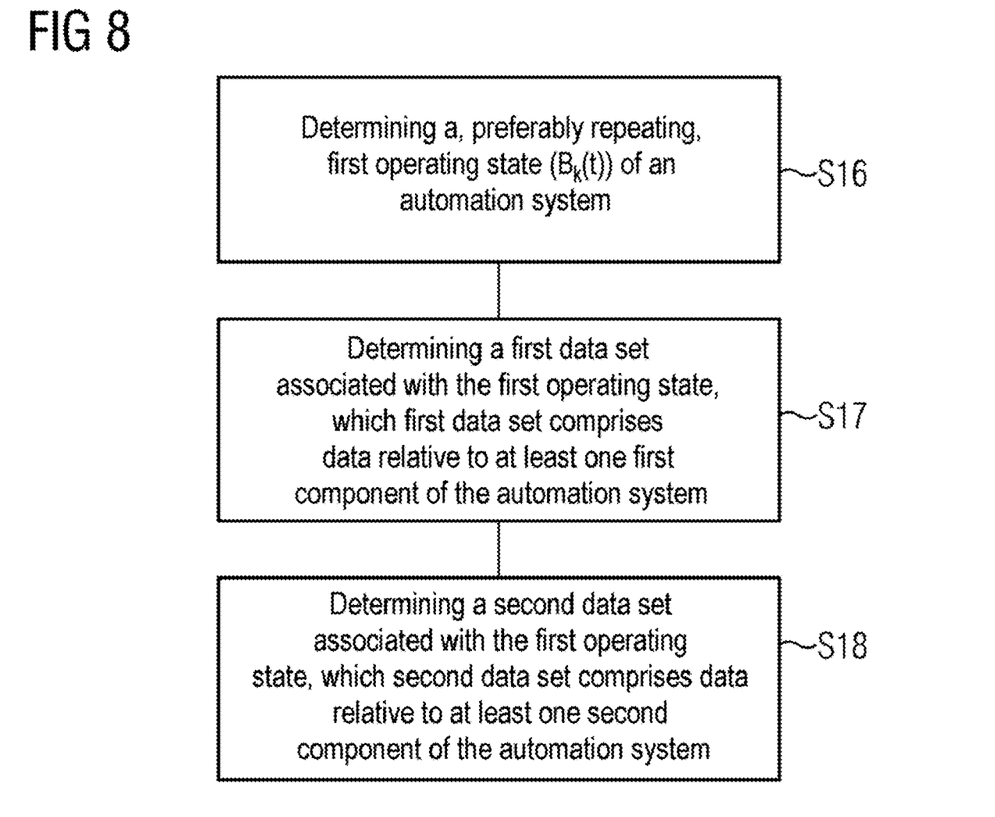
FIG. 8 shows a schematic illustration of an embodiment of a method for cause determination of anomaly events by taking account of different operating states of an automation system.

FIG. 8 shows a further embodiment that may be combined with one or a plurality of acts of the embodiments described in FIGS. 4 to 7. Acts S16 to S18 may be carried out independently of the embodiments in FIGS. 4 to 7. Accordingly, determining a first operating state (Bk(t)) (e.g., repeating) of an automation system may be effected in act S16. Determining a first data set associated with the first operating state may be effected in act S17; the first data set includes data relative to at least one first component of the automation system. Determining a second data set associated with the first operating state may be effected in act S18; the second data set includes data relative to at least one second component of the automation system.

Figure 9:
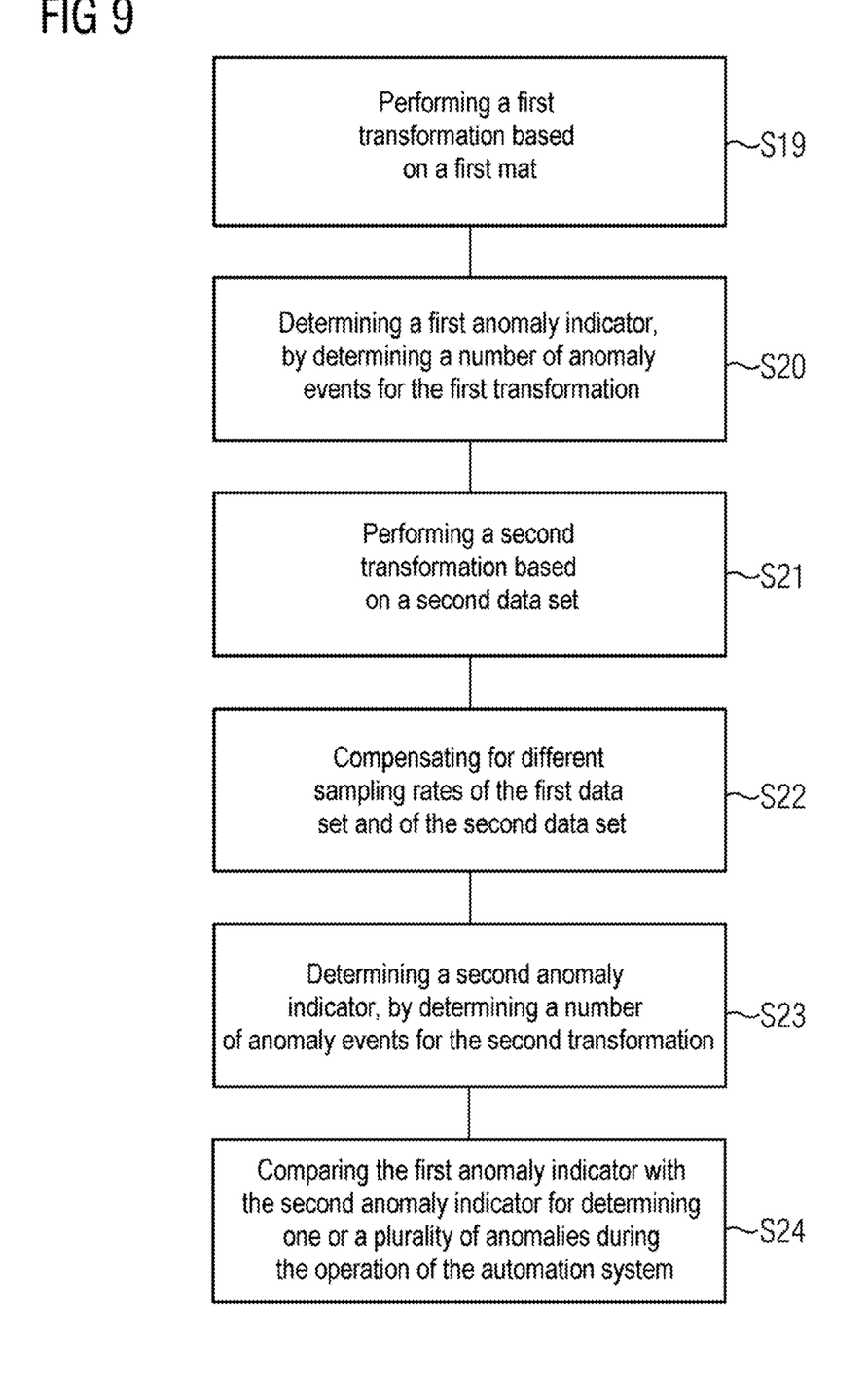
FIG. 9 shows a schematic illustration of an embodiment of a method for cause determination of anomaly events by determining different anomaly indicators.

FIG. 9 illustrates a further embodiment including acts S19 to S24. Performing a first transformation based on a first data set may be effected in act S19. Determining a first anomaly indicator, by determining a number of anomaly events, for the first transformation may be effected in act S20. The first anomaly indicator may correspond to the anomaly score described above, for example. Performing a second transformation based on a second data set may be effected in act S21. Compensating for different sampling rates of the first data set and of the second data set may be effected in act S22. In this case, act S22 of compensating for different sampling rates may be contained in one of acts S21 and/or S19.

Determining a second anomaly indicator (e.g., by determining a number of anomaly events) for the second transformation may be effected in act S23. In this case, the second anomaly indicator may correspond to the anomaly score described above, for example. In one embodiment, the same type of anomaly indicator as for the first anomaly indicator is used for the second anomaly indicator. Comparing the first anomaly indicator with the second anomaly indicator for determining one or a plurality of anomalies during the operation of the automation system may be effected in act S24.

With the suitable transformation (e.g., Hilbert, Wigner-Wille, or the like) being chosen, arbitrary repeating, functional relationships are recognized. By comparison with a correlation, a scaling and spreading of the function underlying the transformation are then also taken into account for determining a relationship between characteristic values.

A data set j with the most anomalies after transformation compared with other data sets k (e.g., after compensation of one or a plurality of operational conditions) is examined more closely as candidates for an anomaly. Using a criterion, such as, for example, a predefined threshold value, it is possible to determine whether this number of anomalies is conspicuous compared with a random occurrence of anomalies. In order to reduce the required computing power, the transformation is restricted (e.g., to two data sets in each case). The order is chosen appropriately for industrial applications by anomaly detection on a portion of the process data being supplemented progressively by data related to event, location, function (e.g., electrical, mechanical, process engineering, logical, acoustic, hydraulic, pneumatic, thermal) in order thus to take into account progressively different timescales and hence periodicities of the systems considered.

Figure 10:
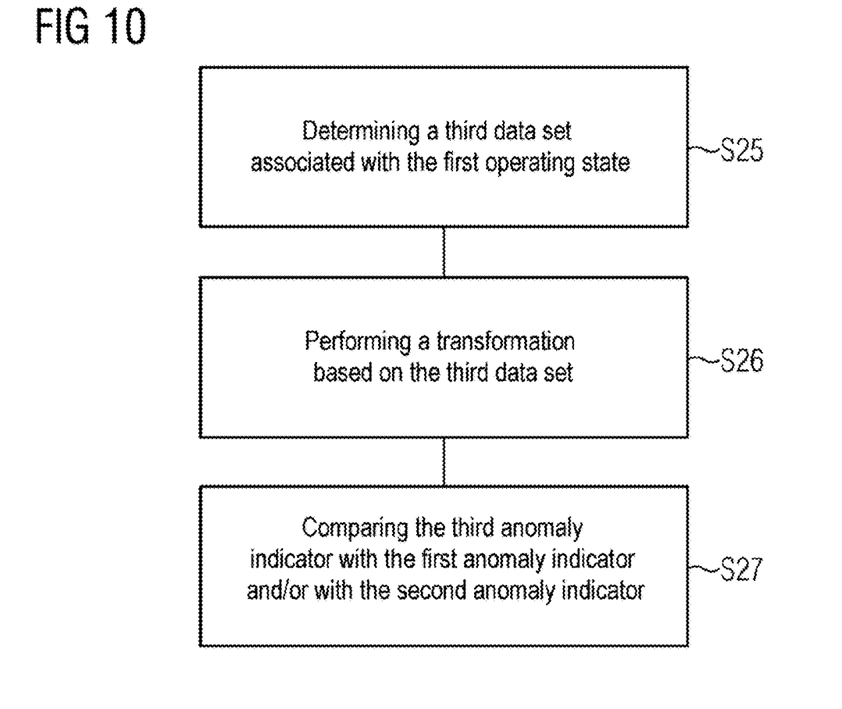
FIG. 10 shows a schematic illustration of an embodiment of a method for cause determination of anomaly events by determining additional anomaly indicators.

FIG. 10 illustrates a further embodiment comprising acts S25 to S27. Determining a third data set associated with the first operating state may be effected in act S25. Performing a first transformation based on a first data set may be effected in act S26. Comparing the third anomaly indicator with the first anomaly indicator and/or with the second anomaly indicator may be effected in act S27. It is thus possible to ascertain which variables have changed in a same way. In addition, an anomaly or one or a plurality of anomaly events may be correlated with a plurality of or all of the variables. This can be done, for example, by calculating the correlation function of the current Fourier transform with the one that serves as a fingerprint. As already mentioned, a Fast Fourier transformation may be used for this purpose.

Figure 11:
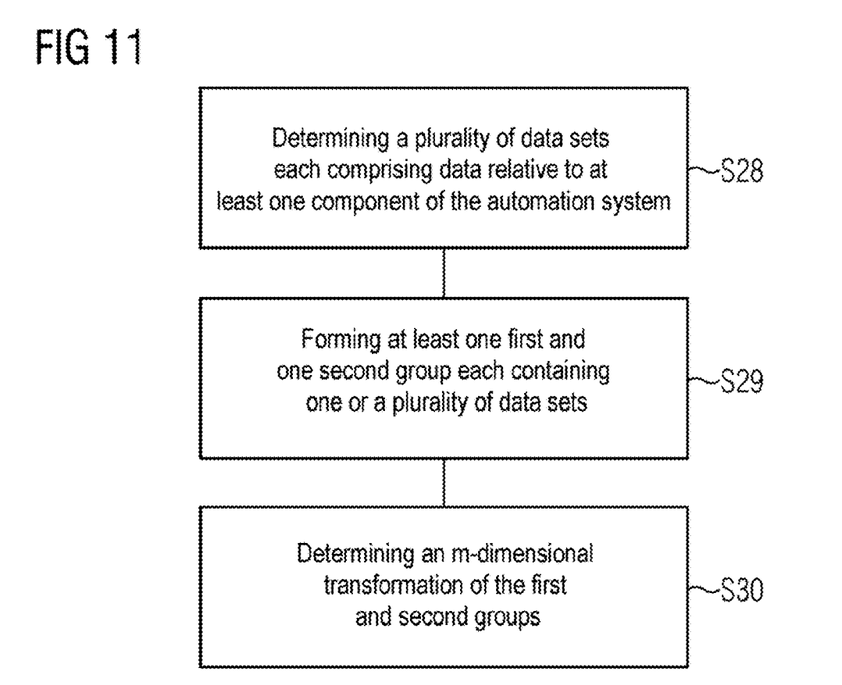
FIG. 11 shows a schematic illustration of an embodiment of a method for cause determination of anomaly events by determining an m-dimensional transformation.

FIG. 11 illustrates a further embodiment including acts S28 to S30. Determining a plurality of data sets each including data relative to at least one component of the automation system may be effected in act S28. Forming at least one first group and one second group each containing one or a plurality of data sets may be effected in act S29. Determining an m-dimensional linear transformation of the first group and the second group may be effected in act S30.

Figure 12:
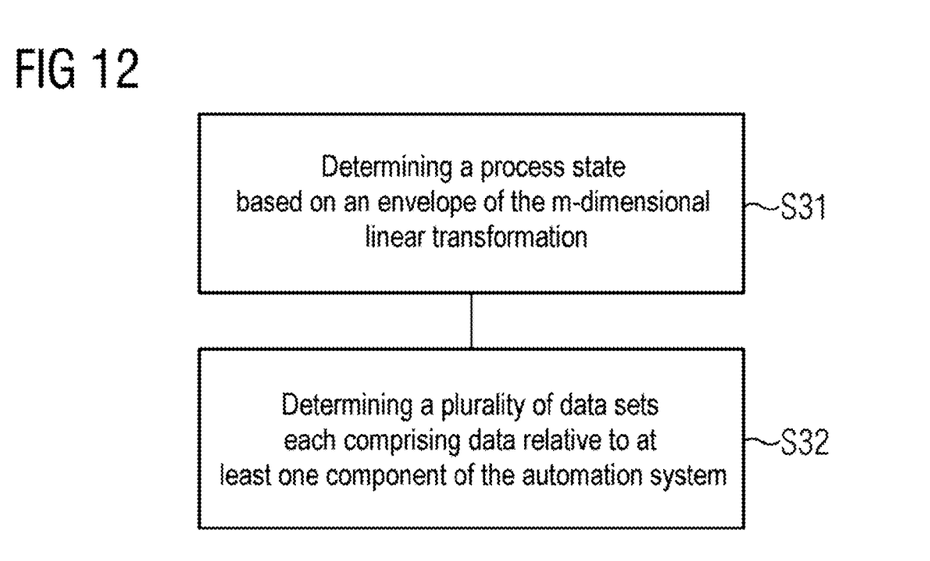
FIG. 12 shows a schematic illustration of an embodiment of a method for cause determination of anomaly events by further evaluation of an m-dimensional transformation.

FIG. 12 illustrates a further embodiment including acts S31 to S33. Determining a process state based on an envelope of an m-dimensional transformation (e.g., the transformation obtained from act S30) may be effected in act S31. Determining a plurality of data sets each including data relative to at least one component of the automation system may be effected in act S32. The envelope serves to group the cyclically relevant data or events and to filter out the non-cyclic data arising only from a static event. For example, the events coming under a peak of the envelope may be grouped to form a process state or used for further consideration. A threshold value may be used for the selection of corresponding peaks. By way of example, the threshold value may be formed based on a mean value or the maximum value of one or a plurality of peaks of the envelope and the mean value of one or a plurality of secondary peaks of the envelope.

Even after the use of a pattern recognition method (e.g., Kalman filters, correlation analyses, SVM, neural networks, decision tree analysis, K-NN, self-organizing maps, hierarchical mixture models, association networks, etc.) according to the present embodiments, a recognition of periods is applied as follows. What is the same in all the methods mentioned is that the methods involve determining an assignment function $zm(f1, \ldots fn)$ to the m-th cluster as a function of the fn data. By applying a multidimensional Fourier transformation to the assignment function, the internal, periodic structure of the cluster is discovered. A non-uniform sampling may be taken into account by the use of a non-uniformly sampled frequency analysis. The reciprocal of the frequencies at which high amplitudes of the Fourier transformation occur indicates the distance between two potential subclusters. The spectral dimensions affected indicate the data dimensions that would be suitable for a further separation of the clusters. A more accurate characterization of the transform is effected based on the shape of the amplitudes that occur. Pointed amplitudes indicate a pronounced periodicity, while flat amplitudes indicate a fluctuation in the periodicity, which may be explained, for example, by fluctuations in shift and production times. Periodic peaks (e.g., sidebands) indicate correlated periodicities (e.g., that anomalies occur every Monday and every first Monday in the month). This information assists cause detection if, for example, typical multiples occur in a plurality of transformations, which may be recognized by a correlation of the transforms. Autocorrelations ($k=j$) allow the periodicity (e.g., correlation length) Tj of one dimension j to be recognized. Pauses, waiting times, etc. may already be taken into account by the pre-processing explained above, and, conversely, recognized periodicities may be used for the identification of operational conditions and thus the iterative choice of BL for the preprocessing. A cross-correlation with other variables (e.g., $k \neq j$) that were conditioned following resampling (e.g., up-/downsampling) and padding with exactly this correlation length Tj during the correlation of other dimensions as well may be used, such that computing time may be saved. An evaluation of the phase shift indicates when a periodic anomaly began vis-à-vis the beginning of the recordings. Periodic anomalies that started early indicate periodic learning, while anomalies that begin later are more interesting since such anomalies concern changes that are more up to date. Since it may be expected that an anomaly is associated with a change in the correlation (e.g., the correlation changes over time), a trend representation of correlations that change to a particularly great extent over time is advantageous. For example, correlations that rise greatly over time may be checked as to whether the correlations are related to the anomaly.

In this case, a plurality or all of the acts mentioned may be interchanged in their order and/or be carried out automatically in succession. Further, it is possible for a plurality of the acts to be combined into one act.

The systematic procedure for characterizing anomalies and finding operational and/or boundary conditions that are possibly the cause of anomalies is advantageous with respect to the acts mentioned above. Further, relationships may be recognized even in the case of a complex automation system with temporally protracted and elongated and also interrupted operational sequences. Further, specific cycle times (e.g., process cycle times) and operational conditions of the respective automation system may be taken into account.

Further, a computer-readable storage medium (e.g., a non-transitory computer-readable storage medium) is provided. The computer-readable storage medium may be a tangible device that may store instructions for use by a command executing device. The computer-readable storage medium may be, for example, an electronic storage device, a magnetic storage device, an optical storage device, an electromagnetic storage device, a semiconductor storage device, or any suitable combination of the above, but is not restricted thereto. A non-exhaustive list of more specific examples of the computer-readable storage medium encompasses the following: a portable computer floppy disk, a hard disk, a random access memory (RAM), a read only memory (ROM), an erasable programmable read only memory (EPROM or Flash memory), a static random access memory (SRAM), a portable CD-ROM memory (CD-ROM), a DVD (Digital Versatile Disk), a memory stick, a floppy disk, a mechanically read punched card, or raised structures in a groove on which instructions are recorded, and any suitable combination of the above. A computer-readable storage medium should not be understood as transitory signals per se, such as, for example, radio waves or other freely propagating electromagnetic waves, electromagnetic waves transmitted by a waveguide or other transmission media (e.g., light pulses passing through a fiber-optic cable), or electrical signals transmitted by a wire.

Computer-readable program instructions described herein may come from a computer-readable storage medium, an external computer, or an external storage device via a network (e.g., the Internet), a local area network, a wide area network, and/or a wireless network. The network can include copper transmission cables, optical transmission fibers, wireless transmission, routers, firewalls, switches, gateway computers, and/or edge servers. A network adapter card or network interface in each computer/processing device receives computer-readable program instructions from the network and forwards the computer-readable program instructions for storage in a computer-readable storage medium within the respective computer/processing device.

Aspects of the present embodiments are described herein with reference to flow diagram illustrations and/or block diagrams of methods, devices (e.g., systems), and computer program products in accordance with embodiments. It goes without saying that each block of the flow diagram illustrations and/or block diagrams and combinations of blocks in the flow diagram illustrations and/or block diagrams may be implemented by computer-readable program instructions. The computer-readable program instructions may be provided for a processor of a general-purpose computer, a special-purpose computer, or some other programmable data processing device in order to produce a machine, such that the instructions are executed by way of the processor of the computer or some other programmable data processing. Other devices provide means for implementing the functions/actions that are specified in the flow diagram and/or block diagram block or blocks. The computer-readable program instructions may also be stored in a computer-readable storage medium, such as, for example, that for a computer, a programmable data processing device, and/or other devices. The computer-readable storage medium in which instructions are stored may contain instructions corresponding to aspects of the function/action specified in the flow diagram by a block diagram, block, or blocks. The flow diagram and the block diagrams in the figures illustrate the architecture, functionality, and operation of possible implementations of systems, methods, and computer program products in accordance with various embodiments. In this regard, each block in the flow diagram or the block diagrams may represent a module, a segment, or a portion of instructions that includes one or a plurality of executable instructions for implementing the specific logical function(s). In some alternative implementations, the functions indicated in the block may occur not in the order indicated in the figures. For example, two blocks that are shown in succession may actually be implemented substantially simultaneously, or the blocks may sometimes be implemented in the opposite order, depending on the functionality involved. It should also be noted that each block of the block diagrams and/or flow diagram depictions and combinations of blocks in the block diagrams and/or in the flow diagram illustration may be implemented by specific hardware-based systems that carry out the specified functions or processes. Examples of hardware-based systems are optical lenses or filter banks as hardware realizations for Fourier transformations, which may also be realized as microelectromechanical systems, while computer instructions carry out correlations and limit value monitoring.

In accordance with yet another embodiment, a computer program product for detecting an anomaly in data that is provided (e.g., by each data source of a plurality of data sources) is described. The computer program product includes one or a plurality of computer-readable storage media with computer-executable instructions executed thereon. The computer-readable storage medium contains instructions for receiving a corresponding time series data sequence from each of the plurality of data sources, where each data sequence represents a number of data values that are detected by a corresponding one of the plurality of data sources with a sampling frequency; each of the data values of each data sequence is sampled at a specific point in time in the time series data sequence.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for evaluating at least one data set of at least one component of an automation system, the method comprising:
   identifying, by a processor, a first data set and a second data set of the at least one data set;
   generating, by the processor, a first transformed data set, the generating of the first transformed data set comprising performing a Fourier transformation comprising or based on data of the first data set;
   identifying, by the processor, two anomaly events in the first transformed data set;
   determining, by the processor, an interval between the two identified anomaly events in the first data set, the first data set comprising data relative to at least one first component of the automation system; and
   determining repeating events spaced according to the interval in a second data set, the second data set comprising data of at least one second component of the automation system.

2. The method of claim 1, further comprising:
performing a Fourier transformation comprising or based on data of the second data set.

3. The method of claim 2, further comprising:
compensating for different sampling rates of the first data set and the second data set, the compensating for different sampling rates of the first data set and the second data set comprising compensating for a sampling rate used in the Fourier transformation.

4. The method of claim 2, wherein performing the Fourier transformation comprising or based on the data of the first data set comprises performing the Fourier transformation comprising or based on data corresponding to the anomaly events, and
   wherein performing the Fourier transformation comprising or based on data of the second data set comprises performing the Fourier transformation comprising or based on data corresponding to the repeating events spaced according to the interval.

5. The method of claim 1, further comprising:
performing an autocorrelation based on the first data set comprising anomaly events in the first data set and based on the Fourier transformation comprising or based on the data of the first data set.

6. The method of claim 1, further comprising:
determining periodic anomaly events in the first data set, determining periodic events in the second data set, or a combination thereof.

7. The method of claim 1, further comprising:
performing a cross-correlation based on the first data set and the second data set, between anomaly events in the first data set and the repeating events spaced according to the interval in the second data set.

8. The method of claim 1, further comprising:
determining one or more anomalies in the first data set, the determining of the one or more anomalies in the first data set comprising determining anomaly events that exceed a predefined threshold value; and
determining an interval between two anomaly events of the one or more anomalies.

9. The method of claim 8, further comprising:
compensating for periodic changes in the interval between the two anomaly events of the one or more anomalies, wherein in the case of periodic changes in the interval between the two anomaly events, a periodicity is used to compensate for the change in the interval between the two anomaly events.

10. The method of claim 8, wherein determining the interval between the two anomaly events of the one or more anomalies comprises determining the interval between the two anomaly events of the one or more anomalies by transformation of the two anomaly events and cross-correlation of transformed data sets for determining a change in the interval between the two anomaly events of the one or more anomalies.

11. The method of claim 1, further comprising:
determining a first operating state of the automation system; and
determining the first data set, the first data set being associated with the first operating state, the first data set comprising data relative to the at least one first component of the automation system; and determining the second data set, the second data set being associated with the first operating state, the second data set comprising data relative to the at least one second component of the automation system.

12. The method of claim 11, further comprising:

determining a third data set, the third data set being associated with the first operating state, the third data set including data relative to at least one third component of the automation system during the first operating state;

performing a transformation based on the third data set, and determining a third anomaly indicator, the determining of the third anomaly indicator comprising determining a number of anomaly events that exceed a predefined threshold value, for the third transformation; and comparing the third anomaly indicator with the first anomaly indicator, with the second anomaly indicator, or with the first anomaly indicator and with the second anomaly indicator.

13. The method of claim 1, further comprising:

performing a first transformation based on the first data set, and determining a first anomaly indicator, determining the first anomaly indicator comprising determining a number of anomaly events that exceed a first predefined threshold value, for the first transformation; and performing a second transformation based on the first data set, and determining a second anomaly indicator, determining the second anomaly indicator comprising determining a number of anomaly events that exceed a second predefined threshold value, for the second transformation; and determining one or more anamolies during operation of the automation system, the determining of the one or more anamolies during operation of the automation system comprising comparing the first anomaly indicator with the second anomaly indicator.

14. The method of claim 1, further comprising:

determining a plurality of data sets that each comprise data relative to at least one component of the automation system;

forming at least one first group and one second group each containing one or a plurality of data sets; and determining an m-dimensional linear transformation of the first group and the second group, wherein m corresponds to a number of data sets of the group.

15. The method of claim 14, further comprising:

determining a process state based on an envelope of the m-dimensional linear transformation; and determining a plurality of data sets that each comprise data relative to at least one component of the automation system.

16. The method of claim 15, further comprising:

providing and storing one or a plurality of results.

17. The method of claim 1, further comprising storing, by a memory, representations of the two identified anomaly events, displaying, by a display, the representations of the two identified anomaly events, or storing, by the memory, the representations of the two identified anomaly events and displaying, by the display, the representations of the two identified anomaly events.

18. A device for evaluation of at least one data set of at least one component of an automation system, the device comprising:

a processor configured to:

identify a first data set and a second data set of the at least one data set;

generate a first transformed data set, the generation of the first transformed data set comprising performance of a Fourier transformation comprising or based on data of the first data set;

identify two anomaly events in the first transformed data set;

determine an interval between the two identified anomaly events in the first data set, the first data set comprising data relative to at least one first component of the automation system; and determine repeating events spaced according to the interval in a second data set, the second data set comprising data of at least one second component of the automation system.

19. In a non-transitory computer-readable storage medium that stores instructions executable by one or more processors to evaluate at least one data set of at least one component of an automation system, the instructions comprising:

identifying a first data set and a second data set of the at least one data set;

generating a first transformed data set, the generating of the first transformed data set comprising performing a Fourier transformation comprising or based on data of the first data set;

identifying two anomaly events in the first transformed data set;

determining an interval between the two identified anomaly events in the first data set, the first data set comprising data relative to at least one first component of the automation system; and determining repeating events spaced according to the interval in a second data set, the second data set comprising data of at least one second component of the automation system.

* * * * *